United States Patent
Placek

[15] 3,675,905
[45] July 11, 1972

[54] METHOD AND APPARATUS FOR INFRARED HEATING

[72] Inventor: Eugene W. Placek, Parma, Ohio
[73] Assignee: Van Dorn Company, Cleveland, Ohio
[22] Filed: Sept. 17, 1970
[21] Appl. No.: 73,165

[52] U.S. Cl. .................................................263/2, 263/52
[51] Int. Cl. ........................................................F27b 17/00
[58] Field of Search ..........................263/2 R, 4, 5 R, 52, 6 R

[56] References Cited

UNITED STATES PATENTS

| | | | |
|---|---|---|---|
| 2,460,085 | 1/1949 | Hess | 263/2 |
| 3,294,382 | 12/1966 | Fannon, Jr. | 263/6 |
| 3,248,099 | 4/1966 | Bratko | 263/6 |
| 2,651,702 | 9/1953 | Burke et al. | 263/2 X |

*Primary Examiner*—John J. Camby
*Attorney*—Meyer, Tilberry and Body

[57] ABSTRACT

The present invention pertains to a novel and improved method of rapidly heating metals and other materials by means of gas-fired infrared generators, and to apparatus therefor. Infrared generators are positioned in close proximity to a workpiece, preferably so that the infrared radiation source is not more than about five inches nor less than about ¾ inch distant from the surface of the workpiece to be heated. Combustion gas from the generator is directed in turbulent flow onto the workpiece surface facing the generator so as to supplement infrared radiant heating (1) by convection/conduction heat transfer to the workpiece and (2) by secondary radiation from the combustion gas. By use of the method and apparatus of the invention, heating of workpieces is obtained with efficiency and speed far in excess of that possible with prior heating methods.

40 Claims, 11 Drawing Figures

INVENTOR.
EUGENE W. PLACEK

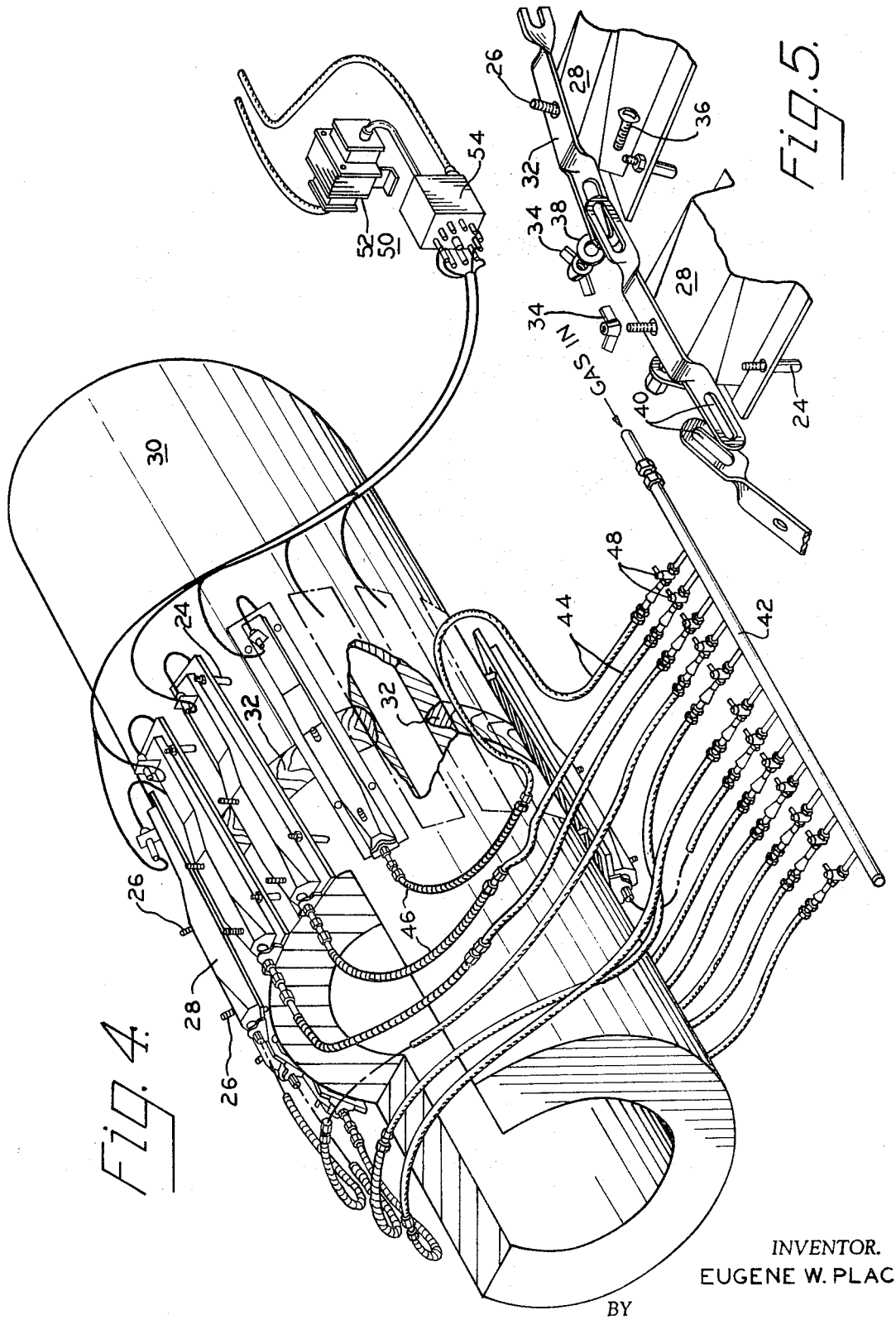

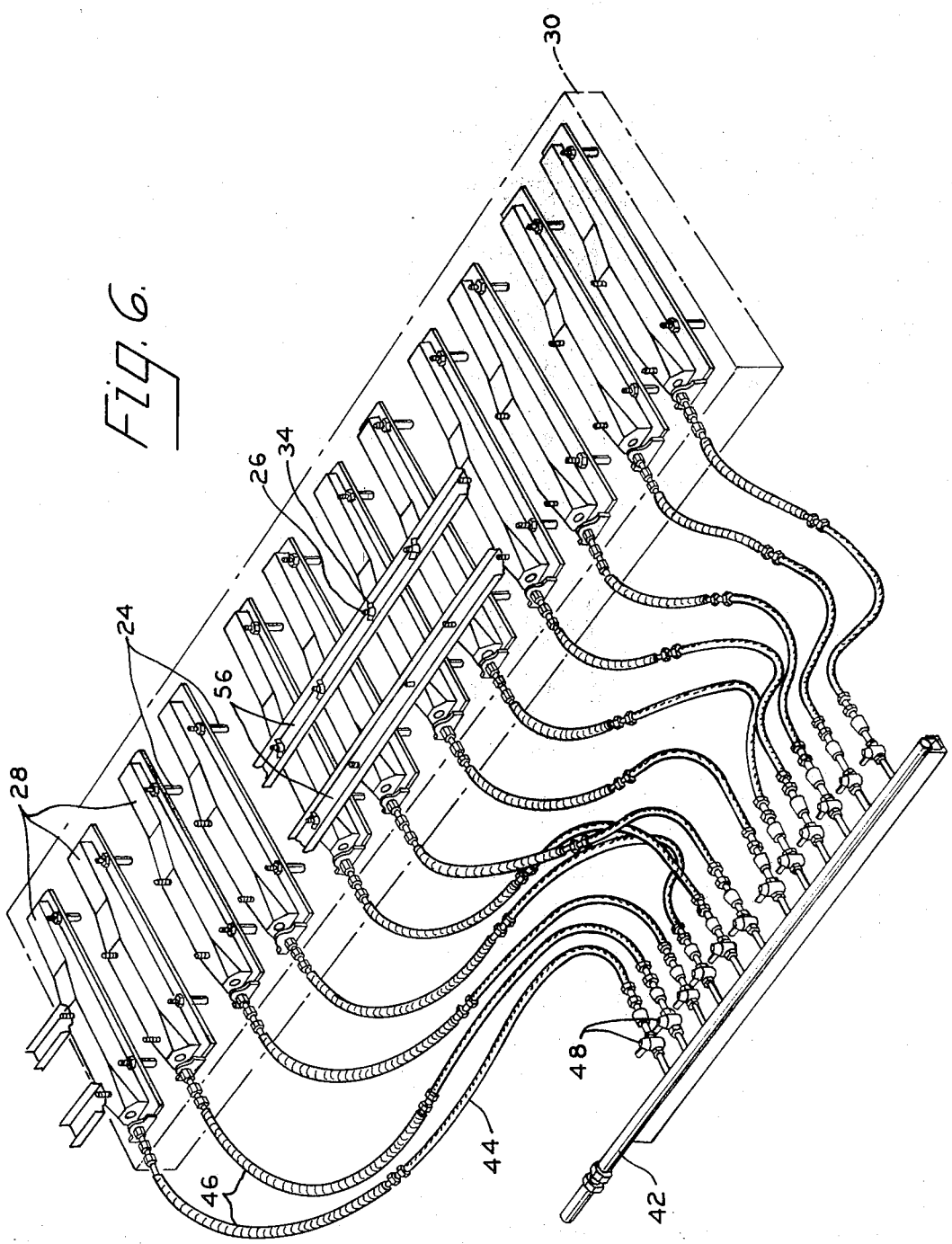

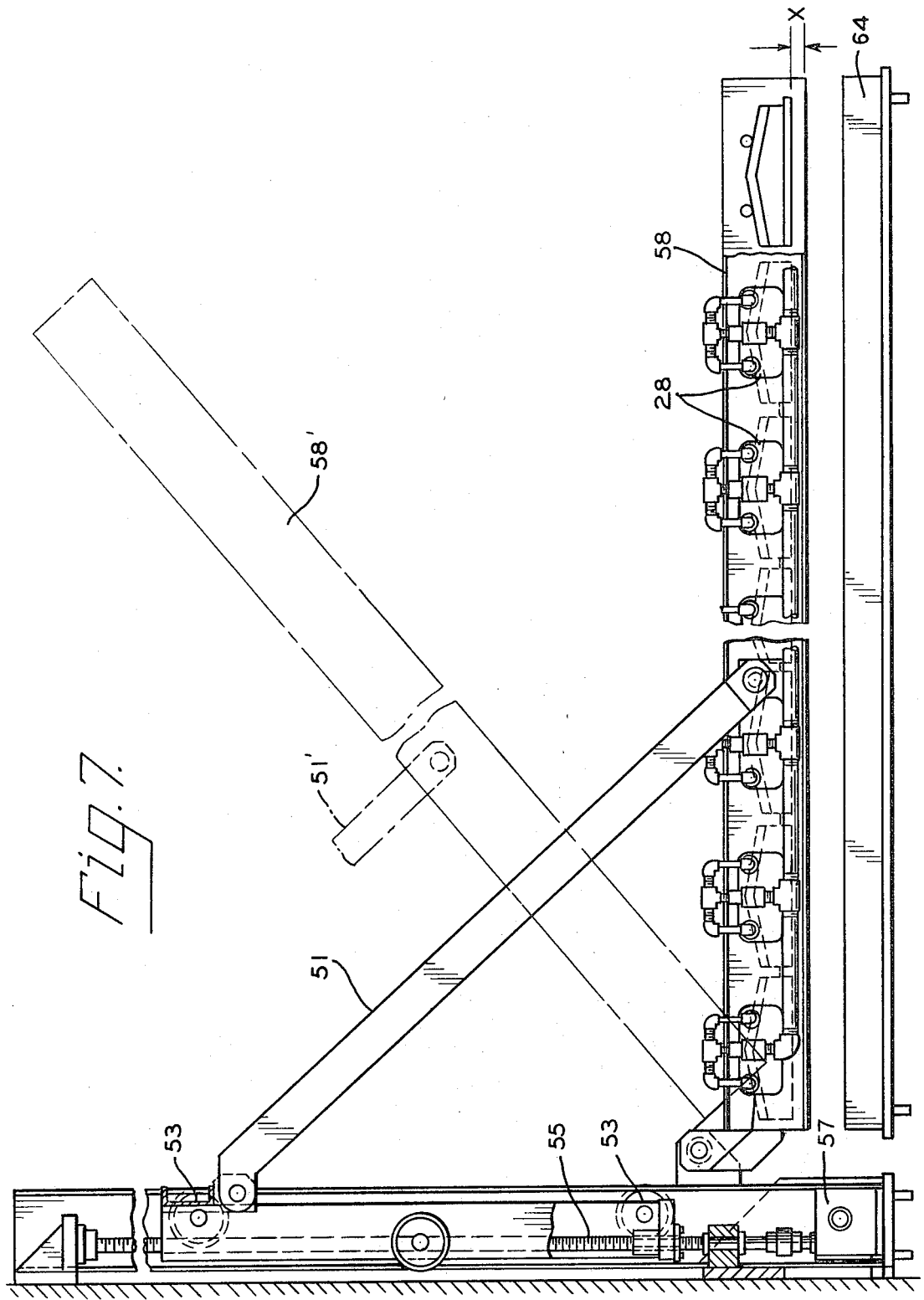

INVENTOR.
EUGENE W. PLACEK
BY
Meyer, Tillery & Body
ATTORNEYS.

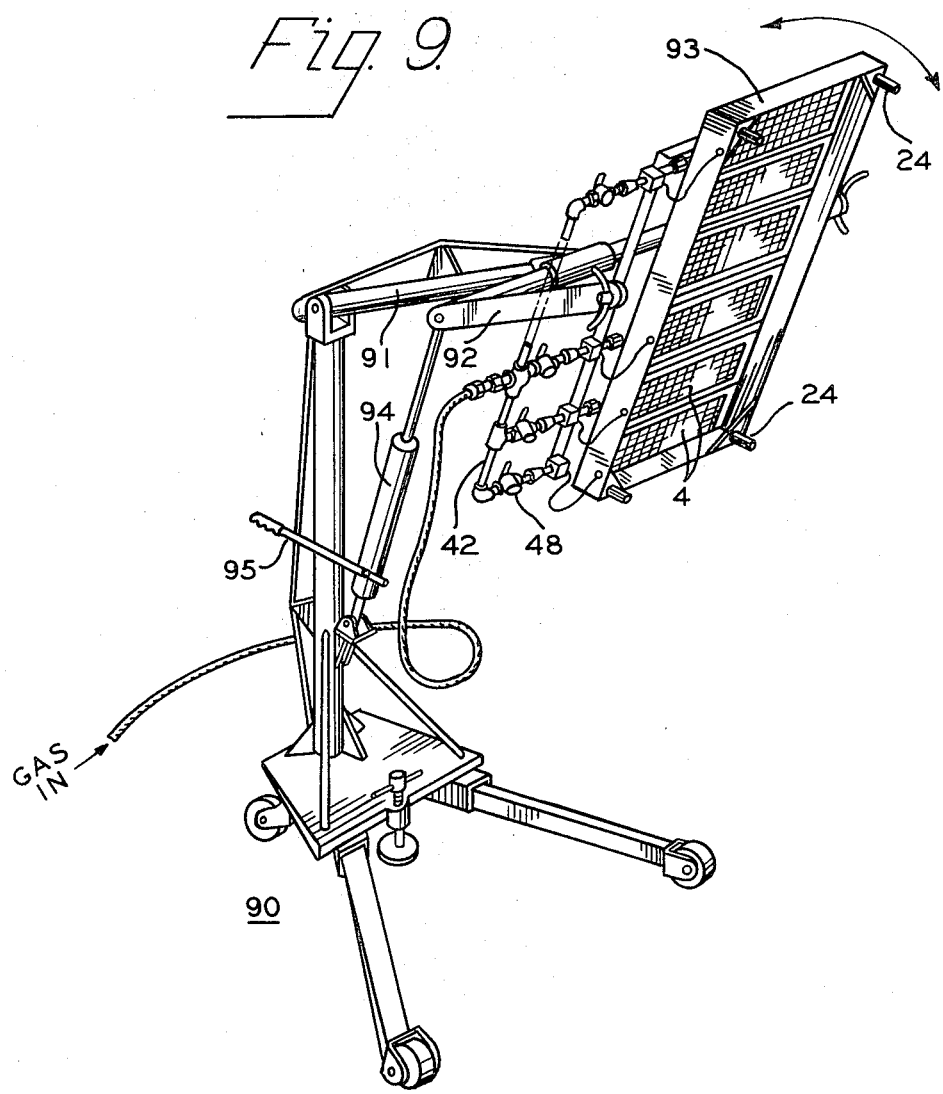

METHOD AND APPARATUS FOR INFRARED HEATING

This application pertains to the art of heating metals and other materials and more particularly to the art of heating such materials by means of gas-fired infrared generators.

The invention is particularly applicable to heating by means of modular gas-fired infrared generator units which are capable of being assembled into multi-unit generators to constitute various infrared generator configurations for a wide variety of specific process and heating uses by conversion of infrared energy to heat.

When infrared radiation impinges upon a body, a portion thereof is absorbed in the body and the latent heat energy in the radiation is released, resulting in heating the body to the extent of the energy absorbed and converted into heat. Another portion of the radiation may pass through the body and have no heating effect upon it, and to the extent this occurs, a body is said to be "transparent" to infrared. A third portion is reflected by the body and has no heating effect upon it. In heating with infrared, it is, of course, desirable that the greatest portion of the infrared energy emission be absorbed by the workpiece to be heated and therein converted into heat. To this end, it is usual practice to attempt to redirect scattered or reflected radiation back towards the body to be heated.

Infrared radiation heating is extremely efficient for the reason that infrared radiation retains its latent heat energy until it impinges upon and is absorbed within a body. Accordingly, unlike convection or conduction heating, very little energy is lost in transmitting infrared radiation from the source (an infrared generator) to the workpiece wherein the radiation is absorbed and its latent heat energy realized. The infrared radiation is not converted into heat until it is absorbed by a body.

Multi-unit infrared heaters have been used to heat workpieces and it is known to assemble the units into chambers of various sizes and configurations to meet specific heating needs. For example, U.S. Pat. No. 3,038,987, to Dow, shows a heating furnace assembled from modular (electric resistance) infrared heating panels.

When infrared radiation impinges upon a body, a portion thereof is absorbed in the body and the latent heat energy in the radiation is released, resulting in heating the body to the extent of the energy absorbed and converted into heat. Another portion of the radiation may pass through the body and have no heating effect upon it, and to the extent this occurs, a body is said to be "transparent" to infrared. A third portion is reflected by the body and has no heating effect upon it. In heating with infrared, it is, of course, desirable that the greatest portion of the infrared energy emission be absorbed by the workpiece to be heated and therein converted into heat. To this end, it is usual practice to attempt to redirect scattered or reflected radiation back towards the body to be heated.

Infrared radiation heating is extremely efficient for the reason that infrared radiation retains its latent heat energy until it impinges upon and is absorbed within a body. Accordingly, unlike convection or conduction heating, very little energy is lost in transmitting infrared radiation from the source (an infrared generator) to the workpiece wherein the radiation is absorbed and its latent heat energy realized. The infrared radiation is not converted into heat until it is absorbed by a body.

Multi-unit infrared heaters have been used to heat workpieces and it is known to assemble the units into chambers of various sizes and configurations to meet specific heating needs. For example, U.S. Pat. No. 3,038,987, to Dow, shows a heating furnace assembled from modular (electric resistance) infrared heating panels.

A significant problem in infrared heating has been that the infrared heating unit must not itself be overheated to the point where the unit is adversely effected as by destruction of the heating elements or reflective coating used to reflect radiation. Overheating of the infrared heating unit is caused directly by absorption of radiation energy emitted from the unit itself, by hot ambient air transferring heat ot the unit by convection, and by radiant heat received from the heated workpiece and furnace structure which, upon being heated, reradiates heat back towards the infrared generator heating unit. If heated to a sufficiently high temperature, the workpiece itself becomes an infrared emitter directing infrared radiation back towards the generator, thereby increasing the temperature of the generator as it absorbs infrared radiation.

The problem of overheating of the infrared generator has been recognized by the art. For example, U.S. Pat. No. 3,059,086 to Pedersen and U.S. Pat. No. 3,083,987, referred to above, show respectively, forced air and water cooling of (electric resistance) infrared generators to prevent destructive overheating of the units.

In the case of gas-fired infrared generators, overheating of the generator unit by radiation from the workpiece or by ambient air is a severe problem when workpiece temperatures exceed 1,000°F. for extended periods of time. This is so because although electric infrared heating units such as those employing quartz tubes can sustain temperatures on the order of about 2,000°F., the surfaces defining the gas-air (plenum) chamber of a gas-fired infrared generator cannot be heated to temperatures in excess of about 1,800°F., and preferably should not be heated to temperatures in excess of about 800°F. The reason is that if the plenum chamber surfaces or any portion thereof become heated to a high enough temperature (about 800°F. or higher), there is danger that the gas-air mixture will prematurely ignite within the plenum chamber. Combustion within the plenum chamber behind the emitter surface will not generate infrared radiation.

Gas-fired infrared generators are supplied with a metallic emitter screen or ceramic grid upon or within which a mixture of gas (usually natural gas, methane, propane or butane) and air is combusted at temperatures below normal open flame temperatures, thereby heating the emitter or grid (hereinafter referred to simply as "emitter") to a temperature at which infrared radiation is emitted therefrom. For purposes of heating by absorption and conversion of infrared radiation, an emitter surface temperature of between about 1,500°F. to 1,800°F. and preferably 1,600°F. is usually maintained. The gas is usually contained in a cylinder under pressure, generally not greater than one psig, and is passed into the plenum chamber, aspirating air therein. The gas-air mixture diffuses through the emitter upon or within which it is combusted.

The gas-air mixture may be supplied at ambient temperature and, of course, plays an important role in helping to cool the generator. However, as the workpiece heats up, it tends to heat the infrared generator both by convection and re-radiation heating. The emitter of the generator is, as aforesaid, maintained at about 1,600°F. and, of course, tends to heat up the rest of the generator assembly. As a result, there is a tendency for the generator to be heated to excessively high temperatures, presenting the danger of pre-ignition of the gas-air mixture in the plenum chamber.

Further, in many gas-fired infrared heating applications, it is necessary to extinguish and then re-ignite the gas firing in a controlled periodic cycle in order to control the rate of heating. This periodic firing is accomplished by extinguishing and then re-igniting the gas-air mixture in response to a signal fed to an automatically controlled ignition device. Proper control of the heating process, of course, requires that ignition take place precisely when called for. If the plenum chamber is hot enough to cause pre-ignition of the gas mixture, this control factor will be lost.

Another adverse effect of overheating is that ceramic emitters, when exposed to excessive heating by being positioned too close to the heated workpiece, tend to rupture due to vibration-induced fatigue and thermal stress, thus causing failure of the generator.

Accordingly, it has been necessary in the prior art to provide means whereby infrared generator heating units, particularly gas-fired generators, are not overheated. This has generally been accomplished in accordance with the teachings of the prior art by various expedients such as (a) removing heated ambient air from around the generator by ventilation or forced draft cooling, (b) positioning the generators far enough from the workpiece to be heated so that the generator is not overheated by radiation or heat transfer from the hot workpiece (c) water cooling of the generator by providing suitable jackets and means therefor, and (d) limiting the use of such infrared generators to relatively low temperature or short duration heating processes.

The disadvantages attendant upon such expedients are apparent. Restricting use of infrared generators to low temperatures or short duration heating processes limits the usefulness of infrared generator heaters and relegates the process user to less efficient heating means such as open flame or conventional gas burner combustion.

Placing the workpiece a distance from the generators diminishes the efficiency of the heating since the flux density of infrared radiation varies approximately as the inverse of the square of the distance between the heater and the workpiece. Nevertheless, in addition to the fear of overheating, another factor exists which has impelled the prior art to position gas-fired infrared heaters a considerable distance from the surface to be heated. This factor is the possibility of ignition "back-flash" into the plenum chamber. The gas entering the plenum chamber must be at a high enough pressure to diffuse through the emitter. If the exiting combustion gases are blocked, as might occur when the heater is placed too near the workpiece surface, increased back-pressure caused by the obstruction would decrease the velocity of the exiting gases to below the combustion propagation rate whereby the combustion would back-flash into the plenum chamber.

Air or water cooling of the heating units reduces the efficiency of heating, requires additional equipment and controls, and makes the heating unit assembly more cumbersome and difficult to position and work with.

The present invention contemplates a novel and improved method of heating by conversion of infrared emission to heat which overcomes the aforesaid problems of overheating the infrared generator assembly without necessity of external cooling thereof, and which permits rapid, efficient heating of workpieces to high temperatures for sustained periods of time. The method is preferably carried out in apparatus designed in accordance with the invention, which apparatus is simple, flexible, and capable of controlled periodic extinguishment and ignition.

In accordance with the present invention, there is provided a rapid and efficient heating method employing a gas-fired infrared generator, the emitter of which is positioned in close proximity to the surface of the workpiece to be heated.

In accordance with a more limited aspect of the invention, the heating method of the invention includes positioning the emitter a distance far enough removed from the surface of the workpiece to preclude back-flash due to interference with escape of the combustion gases, yet close enough to the workpiece surface to insure that a significant portion of the total heat imparted to the workpiece is due to convection heating by the escaping hot combustion product gases.

In accordance with a still more limited aspect of the invention, the emitter is positioned not less than three-quarters inch nor more than 5 inches from the surface of the workpiece to be heated.

In accordance with a still more limited aspect of the invention, there is provided a method and apparatus for stress relieving of welds by heat treating of the same with modular, gas-fired infrared generator heating units which are attached in close proximity to the workpiece so as to conform to its shape.

In accordance with another limited aspect of the invention, there is provided an apparatus to efficiently heat steel or other metal plates more rapidly than was heretofore possible by means of a readily adjustable bank of infrared generators whose energy emissions are converted to heat by absorption thereof by workpieces, and which generators are capable of being adjustably placed in close proximity to the workpiece.

It accordance with yet another aspect of the invention, an infrared generator apparatus is provided which is capable of rapidly and efficiently heating relatively small objects such as machine parts, castings, ceramics, etc. by placing the objects within the apparatus.

The principal object of the invention is to provide a method and apparatus for rapidly and efficiently heating materials by means of infrared generators, the emitters of which are placed in close proximity to the object to be heated.

It is another object of the present invention to provide apparatus for conveniently and removably placing infrared generators in close proximity to objects to be heated.

It is yet another object of the present invention to provide an apparatus wherein relatively small objects to be heated may be placed in close proximity to infrared heating units.

The invention may take physical form in certain parts and arrangements of parts, some preferred embodiments of which will be described in detail in the specification and illustrated in the accompanying drawings which form a part hereof and wherein:

FIG. 1A shows a detail of the emitter of FIG. 1.

FIG. 4 is a perspective view showing an embodiment of the invention adapted to heat a circular section of conduit and particularly adapted to stress relieve, by heating, a weld connection in a circular conduit.

FIG. 5 shows in perspective view a partially exploded detail of the contour following locking links employed in the embodiment of FIG. 4.

FIG. 6 is a side elevation view in partial section of an embodiment of the invention adapted to heat flat sections of a workpiece.

FIG. 7 is a perspective view of an embodiment of the invention comprising a table for heating slab-shaped material such as steel plate or the like in accordance with the invention.

FIG. 9 is a perspective view of a portable stand with an adjustable bank of infrared generator heating elements adapted to be positioned at various angles for heating in accordance with the invention.

It should be noted that identical or similar parts in the various FIGURES bear identical designating numerals.

Figure 1:
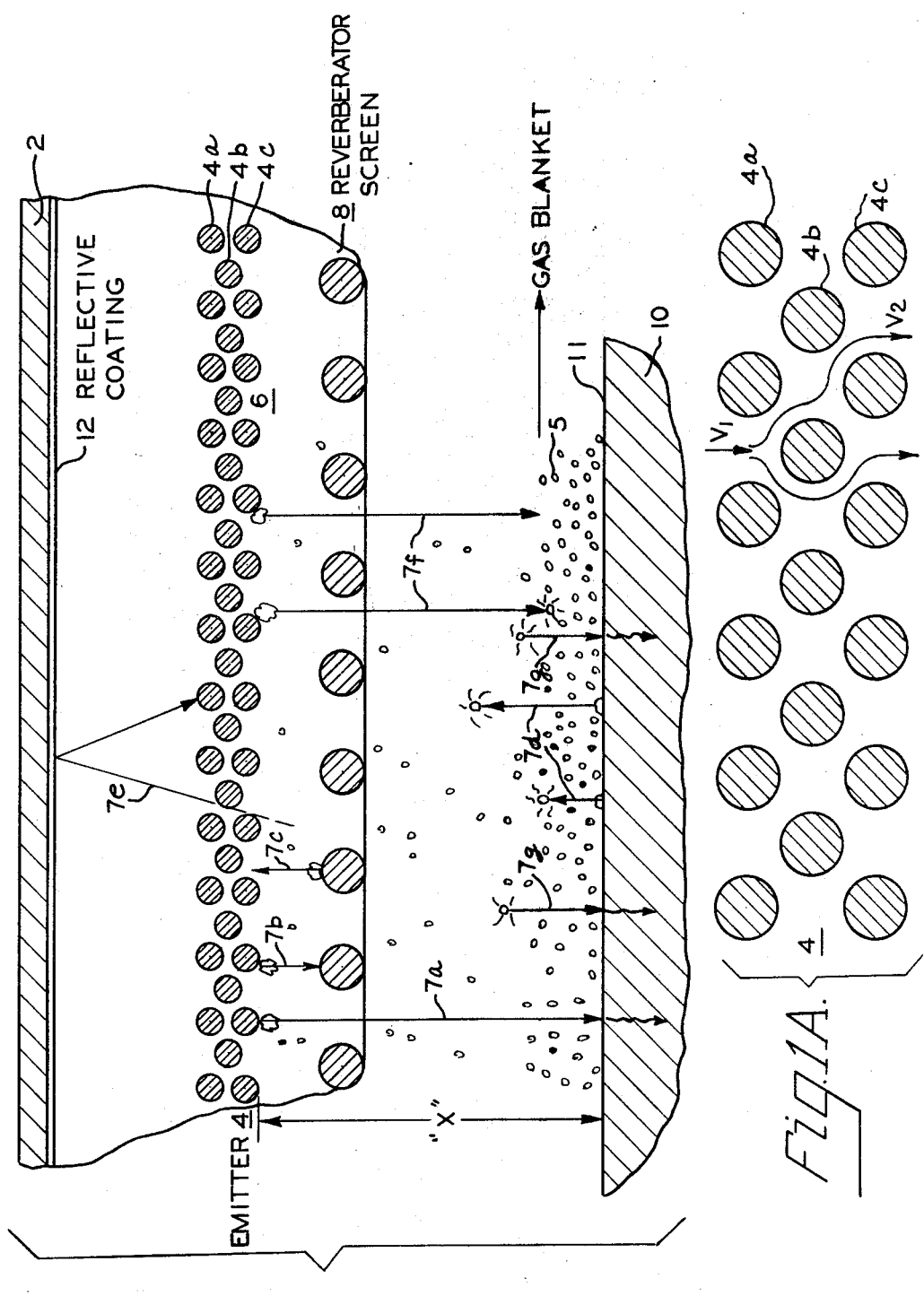
FIG. 1 is a schematic diagram illustrating a theory about the mechanism of infrared heating at close proximity to the workpiece.

As hereinabove stated, the prior art has been faced with the problem of overheating of infrared generators, particularly of gas-fired infrared generators, when it was sought to use these generators for long duration, high temperature heating. For example, high temperature, long duration heating is required for stress relieving of a weld by heating. When a molten weld bead or section is formed between two pieces of metal, the weld bead will tend to contract as it solidifies and cools. It is prevented from so doing because it is, of course, rigidly attached to the metal pieces which it is joining. The metal pieces thus exert a "pull" on the weld bead subjecting it to tensile stress. Sometimes these weld stresses rise to values as high as the yield strength of the material. When the weld stresses are combined with normal load and vibration stresses, the total may exceed the design stresses, causing failure of the weld. Accordingly, weld beads or sections, especially when used in joining conduits and vessels designed to operate under pressure or subject to corrosion, must be stress relieved and this is usually accomplished by heating the solidified weld, often to temperatures as high as 1,200°F. or 1,300°F. for controlled, prolonged periods of time.

Similarly, in the preheating of steel plate to reduce the temperature differential between the plate and molten weld metal or flame, a slab of steel, for example, 6 inches thick, must be heated up to about 400°F. to 600°F. This preheating minimizes the thermal stress to which the slab is subjected when the very high local temperature of a flame cut or welding bead is imposed upon the steel. It has been the practice to effect such preheating by means of flame torches brought directly to bear upon the slab. A 6 inch thick slab of steel could be brought up to 600°F. from ambient temperatures in about 15 hours by this method. Such flame combustion heating in addition to being slow, is highly inefficient. Much of the heat energy of combustion is lost to the surrounding air, the combustion is usually not complete, resulting in inefficiency and creation of air pollutants, and radiant heat escapes in all directions, not just towards the workpiece.

Further, direct flame impingement results in uneven heating or "hot spots" on the surfaces of the slab and often causes severe decarbonization and stress checking of the metal surface, which are extremely detrimental as they tend to propagate any failure of the metal.

Despite their extremely high efficiency, infrared radiation generators used to heat workpieces in services such as those described above have been limited to use in operations where the unit could be force cooled and/or spaced a sufficient distance from workpiece so that the unit is not unduly heated by reradiation from the heated workpiece or by heated ambient air.

It has surprisingly been found that gas-fired infrared heaters can be used in operations heating workpieces to temperatures above 1,000°F. for extended periods of time without undue overheating and with greatly enhanced heating effect by positioning the infrared emitter in close proximity to the workpiece as taught by the present invention. Preferably, the infrared emitter is positioned not less than about three-quarters inch nor more than about 5 inches from the workpiece. At such distances, it has been discovered that the combustion gases expulsed from the gas-fired generator provide a surprisingly beneficial "surface blanket" effect, as will be more fully described hereinafter. (It should be noted that the term "gas-fired" as used herein and in the appended claims to describe a type of infrared generator, means a generator which combusts any suitable fuel upon or within its emitter to heat the emitter to radiation temperature. Such fuels may be gases such as natural gas, methane, propane, butane, etc. or finely divided liquid fuels such as atomized fuel oil, kerosene, etc. For simplicity, all such fuels are deemed to be included in the term "-gas" when used to describe the fuel fed to the generator. The term "combustion gases" as used herein and in the appended claims refers to the products obtained by combustion of the fuel.)

It has been found that if the emitter is placed too close to the surface of the workpiece to be heated, there is not sufficient space to permit the combustion gases to escape and the resulting back pressure will cause back-flash into the plenum chamber. The optimum distance for emitter placement for any particular heating application will vary with the size and firing rate of the heater, the configuration of the workpiece surface, the pressure at which the gas-air mixture is supplied and the temperature to which the workpiece is to be heated. It has been found however, that three-quarters inch is the minimum feasible distance at which the emitter can be spaced from the workpiece surface and still provide sufficient room for the escape of the combustion gases without back-flash.

On the other hand, it has been found that if the emitter is placed at too great a distance from the surface of the workpiece, the beneficial surface blanket effect of the expulsed combustion gases is considerably diminished or lost. The maximum distance permissible between the emitter and the surface to be heated for attaining the benefit of the invention has been found to be a distance at which at least about 10 percent of the total heat imparted to the workpiece is imparted by convection/conduction heating by the escaping combustion gases, with the remainder due to radiation absorption. Under all circumstances tested to date, the maximum effective distance appears to be about 5 inches, although it is possible that under certain circumstances a larger permissible maximum will prevail, for example, where a very large or irregular surface is being treated or low workpiece temperatures are involved.

A proper setting of the distance between the workpiece surface and the emitter will, as aforesaid, vary with each specific case but for almost all heating applications, it will lie between about three-quarter inch and about 5 inches. For the majority of applications, the preferred distance will lie between 1 and 2 inches.

Such close proximity of the infrared radiation source to the workpiece not only promotes extremely rapid heating but has surprisingly been found not to cause excessive overheating of the infrared heating unit when applied in accordance with the invention. Further, the increased rapidity of heating exceeds that which would be expected to follow solely from the high density of infrared radiation obtained by such close proximity (recalling that radiation intensity varies inversely with the square of the distance between the infrared source and the workpiece). An additional heating benefit is obtained by the close proximity of the emitter of the generator in that the escaping combustion gases from the gas-fired infrared generator promote rapid heating of the workpiece by adding convection/conduction heating by the hot gases to the infrared radiant heating.

Further, it is believed that a further enhanced heating effect is caused by secondary radiation emitting from water and other molecules contained in the combustion gases which are excited by absorption of infrared radiation and in turn become energy emitters. The density of water (and other polar molecules such as carbon dioxide) contained in the expulsed combustion product gases and their proximity to the workpiece surface enhances the heating effect of secondary radiation energy absorbed by the workpiece.

Still further, the close proximity of the generator to the workpiece permits the "capture" by the generator emitter of radiation emanating from the workpiece so that much of this "scatter reradiation" which would otherwise be lost, is conserved.

The gas-air mixture supplied to the generator is at ambient temperature and plays an important role in helping to cool the plenum chamber surfaces of the generator. For higher temperature operation, larger quantities of gas-air mixture are supplied and its cooling effect is enhanced.

While not wishing to be bound by the correctness of the following theory, it is believed that these surprising phenomena can be explained as follows.

Figure 3:
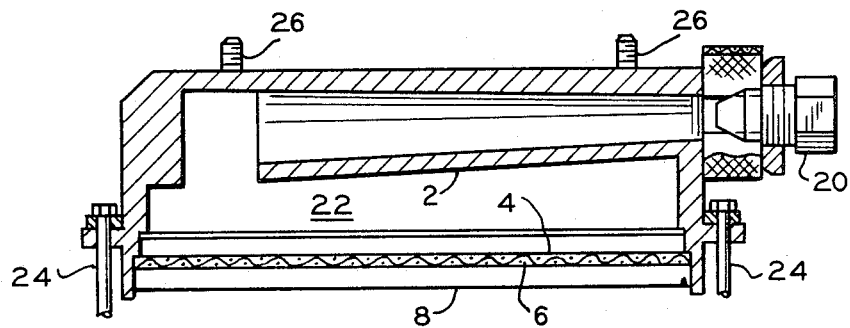
FIG. 3 is a side elevation view in partial section of a gas-fired infrared generator heating unit suitable to be used in accordance with the invention.

Referring now to FIG. 1 which schematically represents key parts of the infrared generator shown in FIG. 3 and in which the like parts are identically numbered with those in FIG. 3, the numeral 2 represents the wall of a plenum chamber into which a gas-air mixture is fed. The gas-air mixture passes through a three-layer emitter 4 comprised of metallic woven screens 4a, 4b and 4c, and is combusted in the emitter generally at 6. The heat of combustion initially heats the emitter to a temperature of between about 1,500°F. to 1,800°F., preferably to 1,600°F. resulting in the emission of infrared radiation, schematically depicted by the arrows 7. Some of the infrared emissions are transmitted to the body of the workpiece 10 and absorbed therein and converted into heat energy as is schematically shown by arrow 7a. Some of the emissions, such as that depicted by arrow 7b, strike reverberator screen 8 and are absorbed therein as heat energy. As reverberator screen 8 is heated, it begins to itself emit infrared radiation, some of which is transmitted back towards the emitter 4. Such interplay radiation is shown schematically by arrow 7c. The heat energy absorbed by emitter 4 from infrared radiation supplied by reverberator screen 8, helps to maintain a suitable infrared emitting temperature of emitter 4. Because of the small distance X (preferably between about three-quarters inch and about 5 inches) between the emitter 4 and the surface 11 of workpiece 10, the escaping combustion gases (shown schematically as molecules 5), are sweeping across the surface 11 of the workpiece 10 at a high, turbulent velocity. The mass velocity of the escaping gas sweeping across the surface is high and therefore the denisty of molecular population and corresponding probability of collision between infrared emissions and gas molecules is also high. Accordingly, as the workpiece 10 heats up and becomes an emitter of infrared radiation, a portion, at least, of the radiation emitted therefrom, shown schematically as 7d, is absorbed by collision with the molecules of combustion products sweeping across the surface. The rapidly moving combustion gases thus not only tend to heat the workpiece 10 by convection/conduction and thereby supplement the infrared radiation heating, but it serves also as a protective surface blanket to prevent excessive reradiation from the heated workpiece 10 back towards the infrared heater. As molecules of the escaping gas absorb radiation, the gas is heated and this heat, or a portion thereof, is transferred by convection/conduction heating back to the workpiece. The combustion gases, it should be noted, are at about the temperature of the radiating emitter 4 when they emerge therefrom, and thus are at a higher temperature than the workpiece. The temperature increase of the combustion gases due to infrared absorption radiated from the workpiece 7d and from the heater 7f, thus serves to increase the heat transfer driving force from the gas to the workpiece. While the blanket of gases also absorbs radiation (arrow 7f) from the emitter, the heat absorbed thereby is not lost to the workpiece, but heats the blanket of gases which in turn transfers heat to the workpiece by convection/conduction.

The combustion gases contain water molecules as well as other molecules which, when they absorbed energy emissions such as infrared radiation, become excited to high energy levels and in turn emit (secondary) radiation. Thus, absorption of radiation by the combustion gases also stimulates the emission of secondary radiation which is believed, as aforesaid, to assist in heating the workpiece especially by virtue of the density and close proximity of the expulsed gases to the workpiece surface. Secondary radiation emissions are shown schematically in FIG. 1 by the arrows 7g.

The enhanced heating effect due to the combustion gases heating is illustrated by reference to Table 1. A test piece of metal to be heated was subjected to infrared radiation heating by a gas-fired generator, the emitter of which was positioned 1.5 inches from the workpiece surface. Thermocouples were attached to the plate by the split-nut method. The emitter was exposed for a period of time to both infrared heating and convection/conduction heating by sweeping the combustion products emerging from the heater across the surface of the plate. Another portion of metal plate was shielded from the combustion gases and heated solely by infrared radiation. Measurements were taken at four points, A,B,C, and D and are tabulated in Table 1.

TABLE I

| Point Measured | ° F. Infrared Only | ° F. Infrared Plus Convection |
| --- | --- | --- |
| A | 950 | 1220 |
| B | 980 | 1245 |
| C | 975 | 1235 |
| D | 965 | 1225 |

Figure 2:
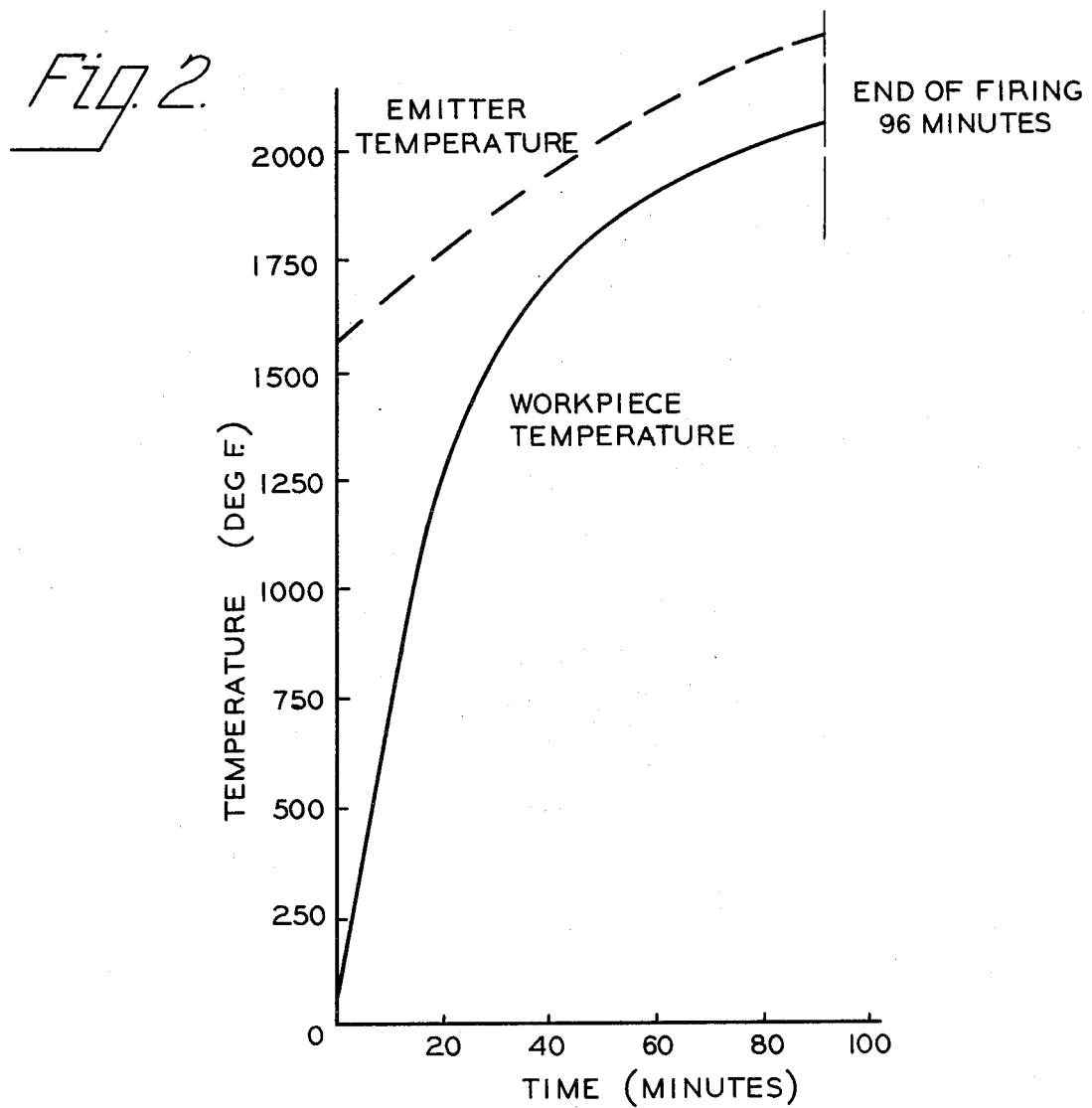
FIG. 2 is a graph showing the time versus temperature relationship of heating a workpiece to 2,310°F. by means of a gas-fired infrared generator.

If the workpiece is to be heated to high temperatures, for example, to temperatures in excess of about 1,350°F. for protracted periods of time, it has been found that the heat and infrared radiation emitted from the workpiece tends to heat the infrared generators to the point where the emitter temperature thereof exceeds the preferred temperature range of 1,500°F. to 1,800°F. While the increased temperature of the emitter is believed to somewhat reduce the efficiency of infrared radiation absorption heating (because of the changed wave length of the infrared radiation emitted at higher temperatures) the enhanced heating effect attained by the practice of the invention more than compensates for any loss of infrared absorption efficiency and highly efficient heating is obtained by the practice of the invention notwithstanding the high emitter temperature. For example, FIG. 2 shows a time versus temperature heating curve of a titanium block measuring 12 ¼ × 4 ¾ heated to a temperature of 2,100°F. in 96 minutes by two 25,000 BTU gas-fired infrared generators, the emitters of which were positioned, respectively, one inch from opposite surfaces of the titanium. The emitter attained a temperature of 2,310°F. at the end of the heating cycle.

It has further been discovered that in order to maintain an adequate fuel supply rate to heat workpieces to temperatures in excess of 1,600°F., the gas-air mixture may advantageously be forced into the plenum chamber by means of a blower. The increased mass velocity of the relatively cool (usually ambient temperature) gas-air mixture aids in keeping the plenum chamber surfaces cooled to 800°F. or below even during such high temperature service. For heating workpieces to temperatures of less than 1,600°F., aspiration of air by low pressure cylinder gas is usually sufficient.

By fabricating the emitter from a suitable metal, such as, for example, Inconel, rather than from ceramic, the emitter has been found to withstand the elevated temperatures encountered in the practice of the invention and the disasterous failures to which ceramic grids in similar service are susceptible, have been avoided. It has been found to be most advantageous to use a woven Inconel wire composed of smaller strands of Inconel, rather than a solid Inconel wire to form the emitter. The added surface area of a woven wire emitter is believed to enhance the infrared emission characteristics of the emitter.

A preferred form of emitter which has been found to be highly efficient in carrying out the practice of the invention, is a woven wire Inconel mesh of thirty by thirty woven strands to the square inch, each strand of a thickness of 0.014 inch. The weave is placed at a 45° angle to the side of the generator.

In general, emitters made of woven metallic material have been found to be desirable for efficient operation at high temperatures of gas-fired infrared generators in the practice of the invention, because they are able to withstand the high thermal stress and vibrations imposed by such service, whereas ceramic grids tend to fail in such service. Further, woven wire metallic emitters preferably, although not necessarily, made of Inconel wire are preferred for their overall generator characteristics.

It has been found to be advantageous to form the emitter is such a fashion that the openings through which the gas-air mixture passes are of a baffled or constricted configuration so that the velocity and turbulence of the gas is increased in diffusing through the emitter. As the gas-air mixture enters the combustion zone of the emitter, the increase in its velocity insures that the velocity of entering gas is in excess of the combustion propagation velocity and the combustion does not "back-flash" into the plenum chamber.

Referring now to FIG. 1A, the gas-air mixture emerging from the plenum chamber, generally represented by numeral 22 (in FIG. 3), has a velocity $V_1$. The gas, as it enters the emitter 4, is constrained by the labryntine, baffle-like effect of the triple-layer of screens 4a, 4b, and 4c to travel a turning, torturous path defined by the off-set openings in the three layers of the emitter. Accordingly, a velocity $V_2$, higher than $V_1$, is imparted to the gas and this increased in velocity aids in preventing back-flash by maintaining the velocity $V_2$ of the gases entering the combustion zone 6 of emitter 4 in excess of the combustion propagation rate. It will be appreciated that other emitter configurations may have a similar velocity enhancing effect such as a tapered perforation whose cross section diminishes moving from the plenum chamber to the combustion zone.

It has also been found to be advantageous to coat the plenum chamber inside surface (2 in FIG. 1) with an extremely thin coating 12 of a reflective substance, such as a vapor deposit film of gold or aluminum or other reflective metal. It suffices for present purposes to state that the coating serves to reflect infrared radiation which enters into the plenum chamber (as shown schematically by line 7e in FIG. 1) back to emitter 4 and reduces the amount of radiation which would otherwise be absorbed by plenum chamber wall 2 resulting in the heating thereof.

Referring now to FIG. 3, a gas-fired infrared generator is schematically shown in section as comprising a gas-air entry port 20, a plenum chamber 22 with back wall 2, an emitter 4 with radiating surface 6, and a reverberator screen 8.

Gas-fired infrared generators generally similar to that shown schematically in FIG. 3 are known in the art and except to the extent to which they are modified so as to be used in accordance with the teaching of the present invention (as will be explained hereinafter), the present invention in no way is dependent upon the specifics of their design.

As hereinabove stated, the present invention is of particular use in the stress relieving of weld metals. Stress relief heating has been accomplished in the past by such devices as burner rings or gas muffles being used to heat the weld area by flame. This method is very little used today because of difficulty of controlling temperatures and the high cost, high maintenance and relatively heavy weight of the gas burning apparatus. Another method of heating to stress relieve welds has been to employ electric resistance wires which are insulated by ceramic beads and wrapped around a workpiece to be heated. This method has disadvantages in that as the wire is heated, it tends to expand, causing the loops of wires to ride one over the other, resulting in hot and cool spots in the heated area, and it imposes surface temperatures of about 2,000°F. on the workpiece, which is undesirable as it causes metallurgical deterioration of the workpiece. Beaded wires are also cumbersome to work with and require a great deal of labor to properly arrange them on the area to be heated. As alternatives to flame heating or electric resistance wire heating, induction heating of the piece to be stress relieved or the use of so-called exothermic kits, i.e., a combustible aluminum powdered material molded around the piece to be treated and ignited, have also been used. These methods have their own problems including difficulty of control with exothermic kits, and the high cost and high power output required for induction heating. In accordance with the present invention, a method of stress relieving welds is shown which is extremely fast and efficient and which may be closely controlled. Referring now to FIG. 4, there is shown in partial section, a conduit 30 which has been connected by a weld 32. In order to stress relieve the welded joint, the joint must be heated to a temperature of, for example, approximately 1,200°F. and such temperature must be maintained for a period of, for example, 1 and ¼ hours for each inch of wall thickness.

A series of gas-fired infrared generators 28 are arranged around the circumference of the conduit, essentially straddling the weld seam as shown. (Obviously, as an alternative, a sequence of two generators could be placed, one on either side of the weld, around the circumference instead of straddling the weld with a sequence of single heaters.) Each generator 28 is supplied with a suitable number, usually four, of stand-offs 24 (as best shown in FIG. 3) to space the generator emitter an appropriate distance from the surface of the workpiece 30. An appropriate distance is preferably anywhere from about three-quarters inch to about 5 inches. In the case shown, a distance of about three-quarters inch to about 1 inch is preferred. The generators 28 are held in place by contour locking links as best shown in FIG. 5. Each gas-fired generator 28 is supplied with contour link lock studs 26 which are adapted to receive contour links 32. Contour links 32 are secured to link lock studs 26 by means of a wing nut 34. Adjacent contour links are joined by removable fastening means comprising a washer 38, a wing nut 34 and bolt 36, which passes through slots 40 provided in the ends of each contour link. By use of the contour link locking arrangement shown, the individual infrared generators 28 may be secured along any contoured surface, regular or irregular, and provide uniformly spaced, close proximity radiant heat to the surface to be heated. The arrangement shown is, of course, particularly adaptable to the circular or ovoid circumference of a conduit or vessel.

It is seen that by the use of flat or contour locking links, any number of individual generators may be positioned to conform to any given surface be it flat, curved, or angular. The locking links are used in a locking link assembly generally comprising contour or flat locking links, adapted to engage in locking relationship with link lock studs on the heaters by means of wing nuts or other stud-locking devices, and adapted to engage in locking relationship with adjacent locking links by means of nuts and bolts or other link joining devices. Generally, flat locking links are useful for use in conjunction with heating flat surfaces, and referring to angular or curved surfaces as "contoured" surfaces, contour locking links are useful in conjunction with heating contoured surfaces.

Each infrared generator 28 is supplied with a gas-air mixture through a manifold 42 which feeds a series of rubber hoses 44, which individually feed each generator by means of a flexible steel connector 46. Gas cocks 48 are provided so that the gas input to individual heaters may be controlled manually (or automatically if desired). Air is inspirated into each of the generators at the gas entry port. Alternatively, as described above, a gas-air mixture may be forced into the generators by suitable blower means, not shown. An ignition system, generally represented at 50, is shown to consist of an ignition transformer 52 and an ignition switch igniter 54 which may be suitably controlled to time re-ignition to maintain the desired temperature.

In FIG. 6, the individual gas heaters 28 are shown arranged in flat configuration and held in place by flat locking links 56. It is apparent that the heaters may be arranged in any length or width by supplying parallel lines of heaters and by extending the number of heaters and the number of flat locking lengths. A flat workpiece is shown at 30.

In order to promote efficient production and to take advantage of the high rate of heating obtainable in accordance with the present invention, a bank of infrared heaters may be arranged on a movable table as best shown in FIG. 7. As aforesaid, thick steel slabs can be heated at rates much higher than those attainable by prior art methods by employing gas-fired infrared generator heaters in accordance with the present invention. For example, a 6 inch thick steel slab can be heated in localized areas to a temperature of 600°F. in about two and one-half hours, or in about one-sixth the time required for heating a similar piece to the same temperature by flame heating.

In order to conveniently handle large size workpieces such as steel slabs, the bank of infrared generators is mounted in a frame 58 which may be raised or lowered over a slab support table 64. This may be accomplished by means of lever arm 51 activated by gears 53 and shaft 55 which is driven in turn by a motor 57. The specific arrangement shown requires mounting support for the frame on one side only of the slab. This permits the steel slab (not shown) to be moved upon the slab support table 64 and the bank of infrared generators 28 contained within frame 58 to be lowered into close proximity to the slab in accordance with the invention. The generators are recessed within the frame 58 a distance X in accordance with the invention. The mounting of the generators is preferably adjustable so that the distance X can be varied. When the slab is at the proper temperature, as indicated by thermocouples, the frame 58 is raised and the slab moved by conveyor or other suitable means (not shown) to the next operation. The raised positions of the frame and lever arm are shown, respectively, in dotted outline at 58' and 51'. A modification of the foregoing embodiment is to provide a second bank of generators in the support table 64 to heat the slab from both sides. The support table may advantageously be supplied with rollers (not shown) or other means to aid in conveying the slab.

Figure 8:
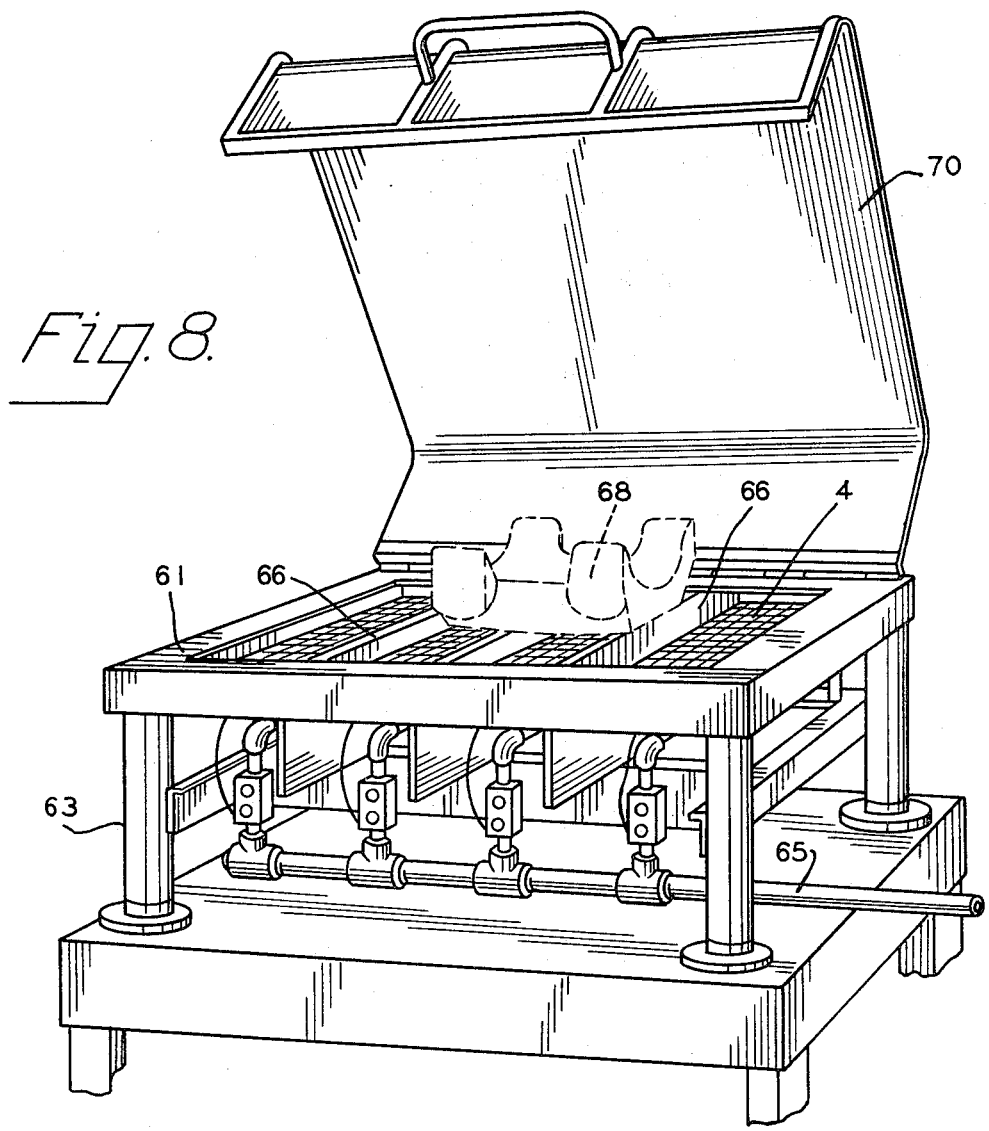
FIG. 8 is a perspective view of an embodiment of the invention comprising an infrared generator modular unit adapted to heat relatively small workpieces in accordance with the invention.

In yet another limited aspect of the invention, a modular table is provided as best shown in FIG. 8 wherein a generally rectangular frame 61 is supported by legs 63. A manifold 65 supplies gas, or in the case of generators supplied by a blower, a gas-air mixture to infrared generators, the emitters 4 of which face upwardly and are visible between stand-off bars 66.

Stand-off bars 66 serve to space one or more small workpieces represented at 68, the proper distance from the emitters 4. Bars 66 are preferably adjustably mounted so that the distance between the infrared emitter 4 and the workpiece can be varied as desired. A hood 70 (shown in open position) is provided to serve as a gas shroud to maintain the combustion gases in rapid turbulent flow around the relatively small workpiece 68. The sides of hood 70 are open to permit escape of the combustion gas and it will be appreciated that the side openings may be restricted by means of a suitable baffle, (not shown) to restrict the escape of gas to the extent desired, or that suitable openings can be provided in the hood in lieu of or in addition to the side openings.

The hood 70 is important in enhancing the gas blanket effect around the surfaces of small workpieces without extensive planar or uninterrupted surfaces. Whereas a larger workpiece has surfaces which can be swept by the emerging combustion gases, small workpieces with irregular surfaces tend to deflect the gases. Accordingly, the hood serves to contain the emerging combustion gases in sweeping flow around the workpiece. The hood circulates the emerging gases around the non-adjacent surfaces of the workpiece. The inner surface of the hood is preferably highly reflective to infrared radiation in order that it may also serve to reflect and redirect infrared radiation back into the workpiece and/or the emitters.

Figure 8A:
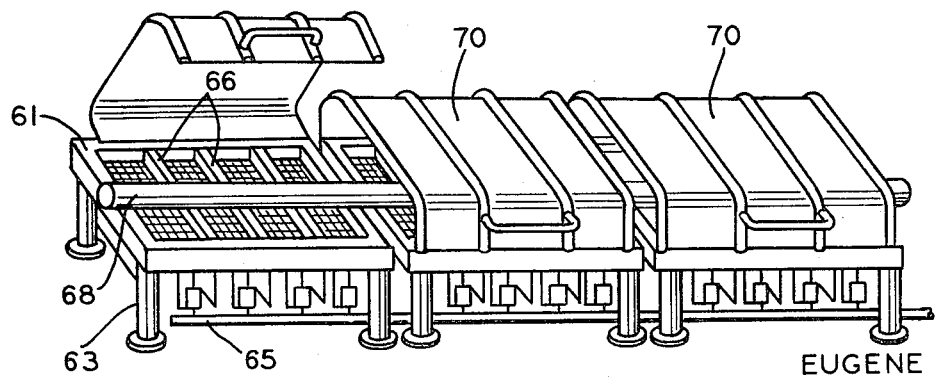
FIG. 8A shows a grouping of several of the units of FIG. 8.

Apparatus in accordance with the invention is thus seen to be conveniently adaptable to heating both large workpieces (in which case the gas-fired infrared generators may be mounted on a movable frame so that they may be adjustably positioned close to the workpiece and then removed therefrom as illustrated in the embodiment of FIG. 7), or quite small workpieces, which are placed upon a stationary infrared generator bed. It will be further appreciated that the modular unit shown in FIG. 8 may be arranged in groups so that longer pieces such as bars or rods may be treated, as shown in FIG. 8A. The hoods 70 of the two units on the right hand side of FIG. 8A are shown in the closed, i.e., operating, position.

As best shown in FIG. 9, a modular grouping of infrared generators may be mounted within a frame 93 which is adapted to be angularly adjusted so that the gas-fired generators or, more accurately, the emitters 4 thereof, can be brought into close proximity to the surface of a large or immovable object regardless of what angle the particular surface to be heated bears to the horizontal. Stand-off spacers 24 may be provided as shown to conveniently set the proper distance, or the frame may be merely locked into position the requisite distance from the workpiece surface. The portable, adjustable frame shown generally at 90 is adapted by means of adjustable support arm 91 and support bracket 92, to position frame 93 so that the emitters 4 are positioned properly with respect to the workpiece to be heated. Adjusting cylinder 94 is manually operated and locked in position by handle 95. While the modular grouping shown in FIG. 9 is flat, it will be appreciated that it may be a contoured grouping adapted to place the emitters in close proximity to a contoured surface such as, for example, the conduit 30 of FIG. 4.

The present invention has thus been described with reference to specific embodiments particularly adapted to carrying out specific heating tasks. The essence of the invention resides however, in some basic discoveries. Among these is the discovery that a gas-fired infrared generator may be placed in close proximity to a workpiece which is to be heated to temperatures, for example, of above about 1,000°F. for extended periods of time without unduly overheating the infrared generator itself and without pre-ignition or back-flash into the plenum chamber.

Another discovery is that by placing the heater in such close proximity to the workpiece, the infrared heating effect is considerably enhanced by, respectively, the secondary radiation, convection/conduction heating and reradiation trapping effects of the blanket of combustion gases.

Thus, the invention is seen to comprise a method of heating objects by placing the infrared emitter of a gas-fired infrared generator in close proximity, preferably between about 1 and about 2 inches, from the surface of the workpiece to be heated. In this manner, the generator plenum chamber surfaces are not overheated and rapid and efficient heating takes place. The generator is advantageously supplied with stand-offs in the form of legs or bars to provide the proper spacing and is further advantageously supplied with an emitter comprising a multiple layer of woven metallic wire or other material with apertures constricted or baffled so as to increase the velocity of gas emerging from the grid to a value in excess of the combustion propagation rate. Still, more advantageously, the generators may be supplied with locking links to enable a group of heaters to be positioned in conformity to the surface to be heated. For heating to temperatures above about 1,600°F., a blower to force the gas-air mixture into the generator is advantageous.

The invention is further seen to comprise utilizing the turbulent blanket of combustion gases sweeping over the surface of the material to be heated to heat the workpiece by convection/conduction heating, to absorb reradiation from the material and to stimulate, by means of absorbed infrared radiation, secondary radiation emissions from constituents of the gases, which secondary emissions assist in heating the material.

Modifications and alterations to the specific embodiments shown will occur to others upon reading and understanding of this specification. It is intended to include, however, all such modifications and alterations insofar as they come within the scope of the appended claims or the equivalent thereof.

Having thus described the invention, I claim:

1. Apparatus for heating comprising:
one or more gas-fired infrared generators,
each generator including emitter means and a plenum chamber from which gas is supplied to said emitter means, said emitter means being adapted to direct infrared radiation upon a material to be heated, whereby a portion at least of such radiation is absorbed by and converted to heat within said material,
openings in said generator through which hot combustion gases are expulsed from said generator,
means for spacing said emitter means a distance from the surface of said material, said distance being such that at least about ten percent of the total heat imparted to said material is imparted by convention/conduction heating from said hot combustion gases and such that ignition back-flash into said plenum chamber is precluded,
means to distribute a combustion gas mixtire to each generator, and
ignition means to ignite said combustion gas mixture.

2. The apparatus of claim 1 including ignition switch controller means to cyclically extinguish and re-ignite combustion.

3. The apparatus of claim 1 including flat locking link means adapted to hold said one or more generators in place.

4. The apparatus of claim 1 including contour locking link means adapted to hold said one or more generators in place.

5. The apparatus of claim 1 wherein said distance is not less than about three-quarters inch and not more than about 5 inches.

6. The apparatus of claim 1 wherein said emitter means comprises a woven metallic screen.

7. The apparatus of claim 1 wherein said emitter means comprises a plurality of woven metallic screens positioned in overlying relationship.

8. The apparatus of claim 1 wherein said emitter means comprises three screens of woven Inconel wire positioned in overlying relationship with the weave at a 45° angle to the sides of said generator.

9. Apparatus for heating comprising:
a plurality of gas-fired infrared generators, each generator including infrared radiation emitters;
contour locking link means adapted to hold said generators substantially parallel one to the other and in substantially cylindrical configuration in encircling relationship about the periphery of a material to be heated so that said emitters face inwardly towards said material; and
stand-off means to space said emitters a distance of not less than about three-quarters inch nor more than about 5 inches from the surface of said material.

10. Apparatus for heating comprising:
a plurality of gas-fired infrared generators, each generator including infrared radiation emitters,
flat locking link means adapted to hold said generators in predetermined relationship over the surface of a material to be heated with said emitters facing said material, and
stand-off means adapted to space said emitters a distance of not less than about three-quarters inch nor more than about 5 inches from the surface of said material.

11. Apparatus for heating comprising:
a plurality of fired infrared generators, each generator including infrared radiation emitters,
a frame adapted to hold said plurality of generators in side-by-side relationship with said emitters facing in the same general direction,
means to adjustably position said frame in proximity to the surface of a material to be heated so that said emitters are positioned at a distance not less than about three-quarters inch nor more than about 5 inches from said surface of said material.

12. The apparatus of claim 11 including stand-off means to hold said frame in a position such that said emitters are spaced at said distance.

13. The apparatus of claim 11 including locking means to hold said frame in a position such that said emitters are spaced at said distance.

14. The apparatus of claim 11 including means to adjustably recess said plurality of generators within said frame so that said frame serves as stand-off means to space said emitters at said distance.

15. The apparatus of claim 11 wherein said generators are held in position such that said emitters are substantially aligned with a contoured surface.

16. The apparatus of claim 11 wherein said frame is adapted to be adjustably raised or lowered over a slab of material to be heated.

17. Apparatus for heating comprising:
one or more infrared generators, each generator including infrared radiation emitters and each generator being mounted within a modular table,
stand-off means mounted within said table adjacent said emitters and adapted to space workpieces to be heated at a distance of not less than about three-quarters inch nor more than about 5 inches from said emitters, and
hood means adapted to direct combustion gases emerging from said generators in sweeping flow relationship around said workpieces and further adapted to reflect infrared radiation from said emitters back thereto and onto said workpieces.

18. The apparatus of claim 17 wherein said stand-off means comprise stand-off bars, said modular table comprises an outer frame which cooperates with said stand-off bars to space said workpieces at said distance from said emitters, and said hood has an inner surface which is highly reflective to infrared radiation.

19. A method of heating a material comprising:
heating emitters of one or more gas-fired infrared generators to infrared radiation temperature by combusting a gas supplied from a plenum chamber to the emitters of said one or more generators,
expulsing hot combustion gases obtained thereby from said one or more generators at a velocity great enough to preclude ignition back-flash into said plenum chambers,
impinging infrared radiation from said emitter upon said material whereby a portion at least of said radiation is absorbed by said material and converted to heat therein, and
directing said hot gases over said material so that at least about ten percent of the total heat imparted to said material is imparted by convection/conduction heating by said hot gases.

20. The method of claim 19 including cyclic extinguishment and re-ignition of the combusting of said gas within said one or more generators whereby the rate of heating is controlled.

21. The method of claim 19 including maintaining said one or more generators in position by means of locking links.

22. The method of claim 19 including positioning said one or more emitters not more than about 5 inches nor less than about three-quarters inch from the surface of said material to be heated.

23. The method of claim 22 wherein said emitters are positioned not more than about 2 inches nor less than about 1 inch from said surface.

24. The method of claim 23 wherein said material is a metal.

25. The method of claim 10 including passing said combustion product gases through openings in said emitter.

26. The method of claim 25 including increasing the velocity of said combustion product gases as they pass through said openings.

27. The method of claim 19 including blowing a gas-air mixture into the plenum chamber of said one or more generators.

28. The method of claim 27 wherein said material is heated to a temperature not less than about 1,600°F.

29. The method of claim 19 wherein said material is heated to a temperature of not less than about 1,350°F.

30. The method of claim 19 including introducing a gas-air mixture to be combusted into a plenum chamber contained within said generator and maintaining said plenum chamber at a temperature of not more than about 800°F.

31. A method of heating a material comprising:
placing the emitter of one or more gas-fired infrared generators not more than about 5 inches and not less than about three-quarters inch from the surface of the material to be heated,
passing hot combustion gases from said one or more generators in turbulent flow over the surface of said material to be heated, and
impinging infrared radiation from said emitter upon said material to be heated whereby a part at least of said radiation is absorbed by said material and converted to heat therein.

32. The method of claim 31 including holding said one or more generators in placed by means of locking links.

33. The method of claim 32 wherein a part at least of the surface of the material to be heated is flat and said locking links are flat locking links.

34. The method of claim 32 wherein a part at least of the surface of the material to be heated is contoured and said locking links are contour locking links.

35. The method of claim 31 including holding said one or more generators in place by means of a frame adapted to be angularly adjusted in relation to the material to be heated.

36. A method of heating slab-shaped materials comprising positioning a bank of gas-fired infrared generators so that the emitters thereof are not less than about three-quarters inch and not more than about 5 inches from the surface of the slab to be heated, passing combustion gases from said infrared generators in sweeping flow relationship over the surface of said slab and impinging infrared radiation from said emitters onto the surface of said slab.

37. A method of heating one or more workpieces comprising positioning said one or more workpieces on a modular table comprising emitters of one or more gas-fired infrared generators, spacing said one or more workpieces not less than about three-quarters inch and not more than about 5 inches from said emitters by means of spacer bars disposed between and among said emitters, directing hot combustion gases from said one or more generators over and around said one or more workpieces by means of one or more hoods emplaced over said one or more workpieces and over said emitters, and impinging infrared radiation from said emitters onto said one or more workpieces.

38. The method of claim 37 wherein said workpieces are spaced not less than about 1 inch and not more than about 2 inches from said emitters.

39. The method of claim 37 including using two or more modular tables to heat an oversize workpiece.

40. A method of heating a material comprising:
combusting a gas within one or more infrared generators containing emitter means to heat said emitter means to infrared radiation temperature,
passing hot combustion gases so obtained in turbulent flow relationship over the surface of said material and between said emitter means and said surface,
impinging infrared radiation from said emitter means onto said material whereby a part at least of said radiation is absorbed by said material and converted to heat therein,
stimulating molecules contained in said hot gases into secondary radiation emissions by radiation bombardment, whereby a part at least of said secondary radiation impinges onto said material and is absorbed and converted to heat therein,
absorbing infrared radiation emanating from said material into molecules of said hot gases, and
heating said material by means of convection/conduction heating by said gases so that at least about ten percent of the total heat imparted to said material is imparted by said convection/conduction heating.

* * * * *